United States Patent [19]

Schaller

[11] Patent Number: 4,563,577

[45] Date of Patent: Jan. 7, 1986

[54] OPTICAL SENSOR AND REFLECTOR TO REFLECT A DIFFERENT WAVELENGTH

[75] Inventor: Werner Schaller, Lampertheim, Fed. Rep. of Germany

[73] Assignee: Siemens Aktiengesellschaft, Munich, Fed. Rep. of Germany

[21] Appl. No.: 479,997

[22] Filed: Mar. 29, 1983

[30] Foreign Application Priority Data

Apr. 13, 1982 [DE] Fed. Rep. of Germany ....... 3213625

[51] Int. Cl.[4] .......................... G01V 9/04; G08B 13/18
[52] U.S. Cl. .................................... 250/221; 340/556; 250/461.1
[58] Field of Search ............... 250/227, 221, 226, 338, 250/461.1; 340/556, 567, 600

[56] References Cited

U.S. PATENT DOCUMENTS 3,839,639 10/1974 Hughes ............................... 250/302
4,220,412 9/1980 Shroyer et al. ...................... 250/226
4,224,608 9/1980 Lederer ............................... 250/221
4,271,358 6/1981 Schwarz .............................. 250/338
4,403,143 9/1983 Walker et al. ....................... 250/227

Primary Examiner—David C. Nelms
Assistant Examiner—J. Jon Brophy
Attorney, Agent, or Firm—Kenyon & Kenyon

[57] ABSTRACT

An optical sensor is disclosed comprising a transmitter which transmits a light beam, a receiver 2 for receiving reflected light and a reflector for directing light from the transmitter to the receiver. The reflector converts the wavelength of the light transmitted by the transmitter and the receiver is tuned to detect light of the converted wavelength. Objects located in the area between the reflector and the combination transmitter/receiver are detected as they do not convert the wavelength of the light from the transmitter even if they reflect light to the receiver.

10 Claims, 3 Drawing Figures

OPTICAL SENSOR AND REFLECTOR TO REFLECT A DIFFERENT WAVELENGTH

BACKGROUND OF THE INVENTION

The present invention relates to an optical sensor of the type which includes a transmitter for transmitting light, a receiver for receiving light and a reflector for reflecting light from the transmitter to the receiver.

In one known sensor of the above type, it is possible that an object entering into the area to be monitored between the transmitter and the reflector acts as a reflector so as to provide a false reflection to the receiver. In other known optical sensors, a separate transmitter and a separate receiver are disposed physically separated from each other to monitor the area therebetween so that an object passing between the two interrupts the light to the receiver. The later sensor is more reliable since it does not respond to reflections from the object but it is technically more complex and costly since two separate pieces of equipment must be made and installed.

OBJECTS AND SUMMARY OF THE INVENTION

It is an object of the present invention to improve a sensor of the reflective type described above at little additional cost so that it does not respond to light reflected by an object located between the transmitter and the reflector.

The above and other objects are achieved by the invention disclosed herein which provides a sensor of the above-described reflective type in which the wavelength of the light reflected by the reflector is converted and light of the converted wavelength is detected by the receiver.

According to an aspect of the invention, the reflector includes a fluorescent plastic, preferably a sheet of fluorescent polycarbonate. Thus, essentially no additional cost is required to manufacture the reflector. Such sheets are commercially available and similar sheets are used in Germany, for example, for protecting persons or objects in road traffic.

According to another aspect of the invention, the receiver can be made to respond to light of the converted wavelength by means of a filter. The filter can tune the receiver so that essentially no additional costs are required to manufacture the receiver. For example, the filter can be placed on a commercially available receiver.

According to another aspect of the invention which takes advantage of the wavelength conversion feature of the invention, the reflector can be of U-shaped cross section with the inner surface of the central web portion of the reflector being the incidence reflective surface directing the incident light to the end faces of the leg portions of the U which act as the emission surfaces. Such a reflector excludes extraneous light and includes one surface for receiving and two surfaces for returning light. The reflector can also be cup-shaped with the inner bottom surface of the cup acting as the incidence surface and the cup wall, preferably provided as a ring cylinder lens, acting as the emission surface. The rim of the reflector which becomes illuminated if aligned exactly can be used for aligning the optical sensor with the reflector.

The above and other objects, features, aspects and advantages of the present invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which.

DESCRIPTION OF THE PREFERRED EMBODIMENTS

Figure 1:
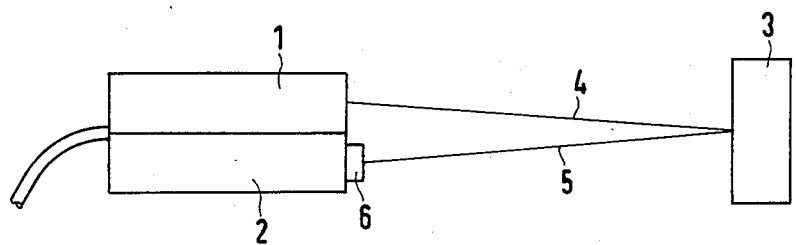
FIG. 1 is a diagrammatic view of an optical sensor according to the invention.

The optical sensor depicted in FIG. 1 includes a transmitter 1 and a receiver 2 disposed in a common housing, and a reflector 3.

The transmitter 1 transmits light 4 to the reflector 3. The reflector 3 converts the wavelength of the light from the transmitter, for example from a shorter-wavelength light to a longer-wavelength light, and reflects the converted wavelength light 5 to the receiver. In order to insure that light 5 of the same wavelength as light 4 is not detected by the receiver, which can otherwise occur, for example, when a mirror-like object is placed between the reflector 3 and the transmitter 1/receiver 2, the receiver 2 is caused to respond to the specific wavelength of the converted light 5. This can be accomplished, for example, by tuning, preferably by disposing a filter 6 before the receiver.

A fluorescent material can be used to convert the wavelength of the light 4 from a shorter wavelength to a longer wavelength, i.e. for example from green to red. The filter 6 can correspondingly be provided as a ring filter which passes red. As a result, commercially available transmitter-receiver combinations can be used and the cost of the reflector and/or filter relative to the transmitter and receiver is negligible. If either the light 4 or the light 5 is interrupted by an object (not shown), the receiver 2 no longer receives light of the required wavelength and a monitor can be activated in known manner.

Figure 2:
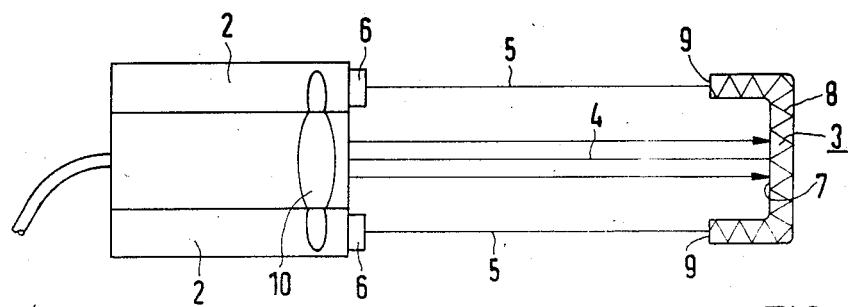
FIG. 2 is a diagrammatic view of an optical sensor according to another embodiment of the invention using a reflector having a U-shaped cross section.

In the embodiment depicted in FIG. 2, the light 4 strkes a U-shaped reflector 3, and more specifically, the surface 7 of the web portion of the reflector. By light refraction and reflection, as indicated by the lines 8, light 5 emerges at the end faces 9 of the leg portions of the U-shaped reflector 3 and impinges on separate filters 6 of a dual input receiver 2. Separate inputs enable the direction of entry of an object into the area between the transmitter/receiver and the reflector to be determined. A U-shaped reflector also provides for shielding of extraneous light. The use of a lens 10 with two focal points (a full convex lens on the inside and a ring convex lens on the outside) has been found to be advantageous.

Figure 3:
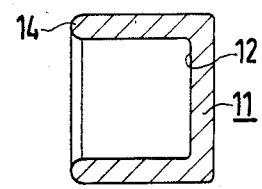
FIG. 3 is a cross-sectional view taken through a cup-shaped reflector for an optical sensor according to another embodiment of the invention.

According to another embodiment, the reflector can be a cup-shaped reflector 11 having a ring cylinder lens 14, as depicted in FIG. 3. A cup-shaped reflector provides even better shielding against extraneous light. For both the embodiments of FIGS. 3 and 2, the light emission ring of the cup or the leg portions of the U, respectively, are configured so that the thickness of the ring or the leg portions is substantially smaller than the respective length extending beyond the bottom 12 of the cup or the surface of the web, so that the angle of emergence of the light is as small as possible. Thus, relatively good focusing is provided. The bottom 12 or web surface 7 can also be made with a slight curvature. The index of refraction of the material in the reflector and the geometric shape are chosen so that the angle provides, as far as the possible, total reflection at the inside walls of the reflector.

Certain changes and modifications of the embodiments of the invention disclosed herein will be readily apparent to those skilled in the art. It is the applicant's intention to cover by his claims all those changes and modifications which could be made to the embodiments of the invention herein chosen for the purpose of disclosure without departing from the spirit and scope of the invention.

What is claimed is:

1. An optical sensor system comprising:
   a transmitter for transmitting light of a first wavelength;
   reflector means disposed for receiving light transmitted by the transmitter, for converting light impinging on the reflector means from said first wavelength to a different second wavelength and for emitting light or said second wavelength upon reception of light of said first wavelength from said transmitter; and
   a receiver disposed to receive light emitted by the reflector means operative to detect light of said second wavelength, wherein the reflector means is of U-shaped cross section having a central web portion and a pair of parallel leg portions extending from the central web portion at opposite ends thereof, the central web portion having an incidence surface facing the transmitter, said incidence surface being at least partially transparent to light from the transmitter, the leg portions having respective end faces acting as the exit surfaces, said exit surfaces being at least partially transparent to light of said second wavelength.

2. The sensor system according to claim 1 wherein the reflector means includes a fluorescent material for converting light from said first wavelength to said second wavelength.

3. The sensor according to claim 1 wherein the transmitter includes a single output and the receiver includes two inputs one for each leg portion of the reflector means.

4. An optical sensor system comprising:
   a transmitter for transmitting light of a first wavelength;
   reflector means disposed for receiving light transmitted by the transmitter, for converting light impinging on the reflector means from said first wavelength to a different second wavelength and for emitting light of said second wavelength upon reception of light of said first wavelength from said transmitter; and
   a receiver disposed to receive light emitter by the reflector means operative to detect light of said second wavelength, wherein the reflector means is in the form of a cup having a bottom wall and a perimetral side wall attached to said bottom wall at one end and defining an opening at an opposite end, said bottom wall having an inside surface facing said transmitter and said opening and acting as the incidence surface, the side wall of the cup having an end face surrounding said opening and acting as the exit surface.

5. The sensor system according to claim 4 wherein the side wall of the cup is in the form of a ring cylinder lens.

6. The sensor system according to claim 2 wherein the fluorescent material is included in a polycarbonate plastic material.

7. The sensor system according to claim 1 and comprising a filter for tuning the receiver to light of the second wavelength.

8. The sensor system according to claim 4 wherein the reflector means includes a fluorescent material for converting light from said first wavelength to said second wavelength.

9. The sensor system according to claim 8 wherein the fluorescent material is included in a polycarbonate plastic material.

10. The sensor system according to claim 4 and comprising a filter for tuning the receiver to light of the second wavelength.

* * * * *